United States Patent
Yin

(10) Patent No.: US 8,117,320 B2
(45) Date of Patent: Feb. 14, 2012

(54) ALLOCATION OF TRACKER RESOURCES IN A COMPUTING SYSTEM

(75) Inventor: Liang Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 11/479,377

(22) Filed: Jun. 30, 2006

(65) Prior Publication Data

US 2008/0005338 A1 Jan. 3, 2008

(51) Int. Cl.
  *G06F 15/16* (2006.01)
(52) U.S. Cl. ........ 709/228; 709/202; 709/227; 709/251; 370/400; 370/403
(58) Field of Classification Search .......... 709/202–203, 709/226–229, 251; 705/77–78; 370/400–406
  See application file for complete search history.

(56) References Cited

U.S. PATENT DOCUMENTS

| | | | | |
|---|---|---|---|---|
| 5,548,724 A * | 8/1996 | Akizawa et al. | ............. | 709/203 |
| 5,590,197 A * | 12/1996 | Chen et al. | .................... | 705/78 |
| 5,592,620 A * | 1/1997 | Chen et al. | .................... | 709/223 |
| 5,603,029 A * | 2/1997 | Aman et al. | .................. | 718/105 |
| 6,009,488 A | 12/1999 | Kavipurapu | | |
| 6,614,796 B1 * | 9/2003 | Black et al. | .................. | 370/403 |
| 6,850,970 B2 * | 2/2005 | Littlefield | ..................... | 709/203 |
| 6,944,719 B2 * | 9/2005 | Rowlands et al. | ............ | 711/141 |
| 7,428,573 B2 * | 9/2008 | McCanne et al. | ............ | 709/203 |
| 7,490,135 B2 * | 2/2009 | Klug et al. | ..................... | 709/203 |
| 2005/0240734 A1 * | 10/2005 | Batson et al. | ................. | 711/141 |
| 2009/0265473 A1 * | 10/2009 | Hydrie et al. | ................. | 709/229 |

* cited by examiner

*Primary Examiner* — Bharat Barot
(74) *Attorney, Agent, or Firm* — Blakely, Sokoloff Taylor & Zafman LLP

(57) ABSTRACT

A number of caching agents are interconnected by a ring. A number of trackers of a home agent are pre-allocated to each of the number of caching agents. A tracker provides a permit for a caching agent to issue a request to the home agent. In case a caching agent needs to issue more requests to the home agent, the caching agent may borrow a tracker from another caching agent by sending a message via the ring to other caching agents. A caching agent receiving the borrowing message may either respond the borrowing message by lending a tracker pre-allocated to the corresponding caching agent, or deny the borrowing request by forwarding the borrowing message to another caching agent.

24 Claims, 6 Drawing Sheets

ALLOCATION OF TRACKER RESOURCES IN A COMPUTING SYSTEM

FIELD OF THE INVENTION

The field of invention relates generally to the computer sciences, and more specifically, to a mechanism for allocation of resources of a computing system.

BACKGROUND

In a typical multi-processor computing system, a number of caching agents are interconnected via a network. A "caching agent" is a unit containing one or more processing cores (e.g., one or more units of logic circuitry that executes program code) that may have associated cache(s) for its respective processing cores. These caching agents may share a same system memory. In order to access the system memory, a caching agent issues a memory request to a home agent (or home node) of a memory controller controlling the system memory. The "home agent" of the memory controller is responsible for handling the semantics of the transactions that the memory controller deals with over a network connecting the caching agents with the home agent.

Of interest in the multi-processor computing system are the transactions that occur over the network between the caching agents and the home agent (e.g., to effect coherent caching and shared access to the system memory for data and/or instructions). The cornerstone of a source snoop broadcast protocol that does not use negative acknowledgement is the pre-allocation of tracker resources (or credits) at the home agent. The tracker resources may be a multiple-entry structure that is used to keep "track" of the state of these transactions. Each entry may represent a tracker. According to this protocol, pre-allocation requires that a caching agent is allocated a tracker prior to sending a memory access request to the home agent. Static partitioning of the trackers divides the trackers into groups. Each group is allocated exclusively to a particular caching agent. One of the disadvantages of static partitioning is less efficient use of these trackers caused by less flexible resource allocation. For example, some caching agents may need to issue fewer memory access requests than other caching agents. Thus, some of the trackers pre-allocated to the former caching agents may stay unused while the later caching agents are really short of trackers for issuing new memory access requests.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus of allocation of a home agent's tracker resources are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

One embodiment of the present invention includes a technique that enables allocation of a home agent's tracker resources, according to a hybrid mechanism, to a number of caching agents, which, in an exemplary embodiment, are interconnected by a ring. According to the technique, each caching agent is pre-allocated a number of trackers during initialization. If one caching agent determines, according to its current tracker usage condition, for example, that it needs to have more trackers, the caching agent sends a message for borrowing a tracker from another caching agent in the ring. In one embodiment, the message is first sent to the next ring node (or caching agent). Upon receiving the message, the receiving caching agent determines whether it may lend a tracker to the borrowing caching agent (hereinafter "the borrower"). If the receiving caching agent determines it may lend a tracker to the borrower, then the receiving caching agent sends a response message to the borrower. Otherwise, the receiving caching agent forwards the borrower's message to the next caching agent in the ring. The term "hybrid" is used in describing the present invention, because the present invention is a combination of static and dynamic tracker allocation approaches. Instead of reserving a fixed number of trackers exclusively to each caching agent all the time, each caching agent may dynamically adjust the number of trackers it may have by borrowing/lending tracker(s) from/to other caching agents depending on the need, therefore, providing enough flexibility to enable caching agents with more memory access requests to have more trackers, and vice versa.

Figure 1:
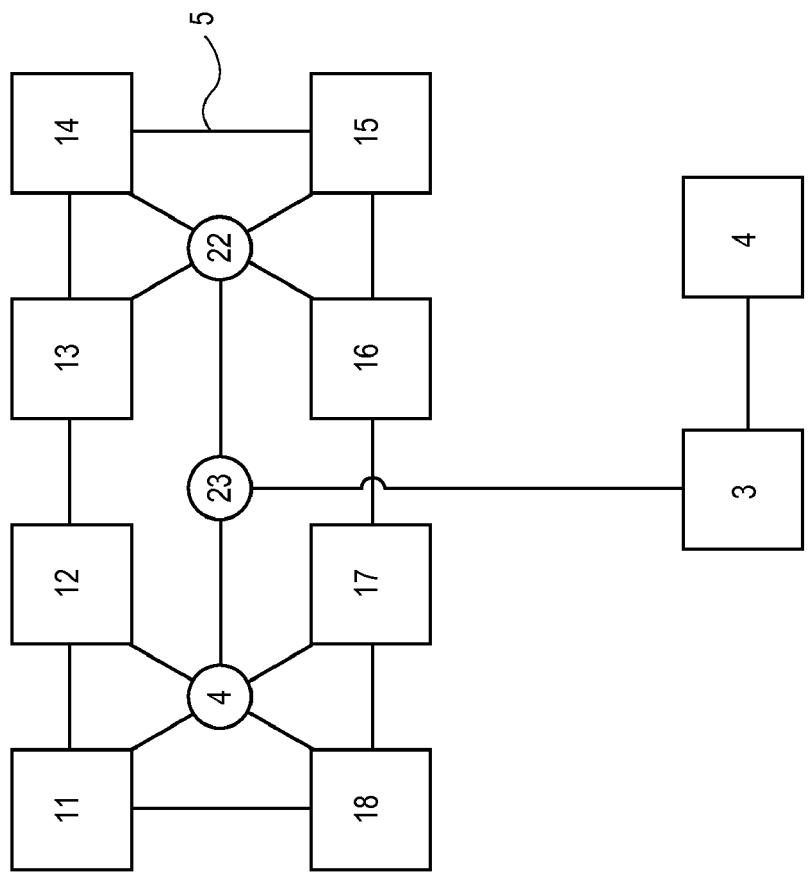
FIG. 1 shows a multi-processor system having a number of caching agents interconnected by a ring.

FIG. 1 shows a multi-processor system having a number of caching agents interconnected by a ring. As shown in FIG. 1, a number of caching agents 11-18 are interconnected by a ring 5. These caching agents share a system memory 4 which is coupled to a home agent 3. The caching agents are connected with the home agent 3 via three bridges 21-23. Note that the number of bridges is not necessary to be three. For scalability purposes, multiple levels of bridges may be used. For example, as shown in FIG. 1, bridges 21 and 22 are first level bridges which are connected to caching agents directly; whereas bridge 23 is a second level bridge connecting the two first level bridges 21 and 22 to the home agent 3. In one embodiment, these bridges do not maintain any information regarding the usage of trackers of the home agent 3. Yet in some pure static tracker allocation schemes, each bridge records the number of trackers used by the transactions coming through it. Since pure static tracker allocation schemes are not germane to the present invention, further discussion is not necessary.

In one embodiment, the ring 5 may consist of two links, one for transmitting tracker borrowing messages, and the other for transmitting messages in response to these tracker borrowing messages. Alternatively, the ring may consist of one link, but the link is divided into two virtual links, one for transmitting tracker borrowing messages, and the other for transmitting messages in response to these tracker borrowing messages.

Figure 2:
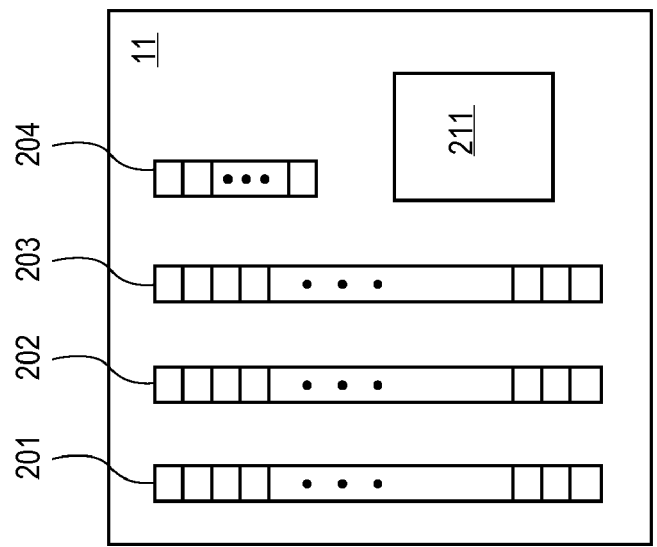
FIG. 2 is a detailed block diagram of a caching agent such as one shown in FIG. 1 according to an embodiment of the present invention.

FIG. 2 is a detailed block diagram of a caching agent such as one shown in FIG. 1 according to an embodiment of the present invention. As shown in FIG. 2, caching agent 11 maintains four vectors, the tracker allocation vector 201, the borrowed tracker vector 202, the tracker usage vector 203 and the sharable tracker vector 204.

The tracker allocation vector 201 records trackers that are statically pre-allocated to the caching agent 11 during initialization. The tracker allocation vector 201 has the same number of entries as the total number of trackers the home agent 3 has. For example, if the home agent 3 has 64 trackers, then the tracker allocation vector 201 has 64 entries, each representing one tracker. Each entry may be a one bit flag. Value "1" may represent that the tracker entry is statically pre-allocated to the caching agent, and value "0" may represent that the tracker is not statically pre-allocated to the caching agent. For illustration purposes, an index is assigned to each tracker for unique identification.

The borrowed tracker vector 202 records trackers borrowed from other caching agents. The borrowed tracker vector 202 has the same number of entries as the tracker allocation vector 201. Each entry may be a one bit flag. Value "1" may represent that the corresponding tracker is borrowed from another caching agent. Otherwise, the entry is set to "0".

The tracker usage vector 203 records trackers currently being used by the caching agent 11 or currently being borrowed by another caching agent. The tracker usage vector 203 also has the same number of entries as the tracker allocation vector 201. Similarly, each entry may be a one bit flag. Value "1" may represent that the corresponding tracker is being used by the caching agent 11. Value "0" may represent that the corresponding tracker is not being used by the caching agent 11. Because caching agent 11 may borrow tracker(s) from other caching agents, a tracker being used by caching agent 11 may not be one of the trackers statically pre-allocated to it during initialization.

To simplify the implementation of the present invention, the $n^{th}$ entry of the tracker allocation vector 201, the $n^{th}$ entry of the borrowed tracker vector 202 and the $n^{th}$ entry of the tracker usage vector 203 all correspond to the same tracker, wherein n is an integer from 1 to the size of the vector.

The sharable tracker vector 204 records the tracker(s) which are available to be shared by (or lent to) other caching agents. In one embodiment, the sharable tracker vector 204's size is the number of trackers statically pre-allocated to caching agent 11. Alternatively, the sharable tracker vector 204 may have the same size as the tracker allocation vector 201. In one embodiment, caching agent 11 may reserve for itself at least one tracker that is not available for share.

Also shown in FIG. 2 is the tracker control logic 211, which controls/manages trackers that have been allocated to caching agent 11. The functionality of tracker control logic 211 also includes determining whether it is necessary to borrow a tracker from another caching agent and determining whether caching agent 11 has sharable trackers available to be lent to other caching agents. Alternatively, the tracker control logic 211 may be divided into multiple control logics, each handling a different task mentioned above.

Figure 3:
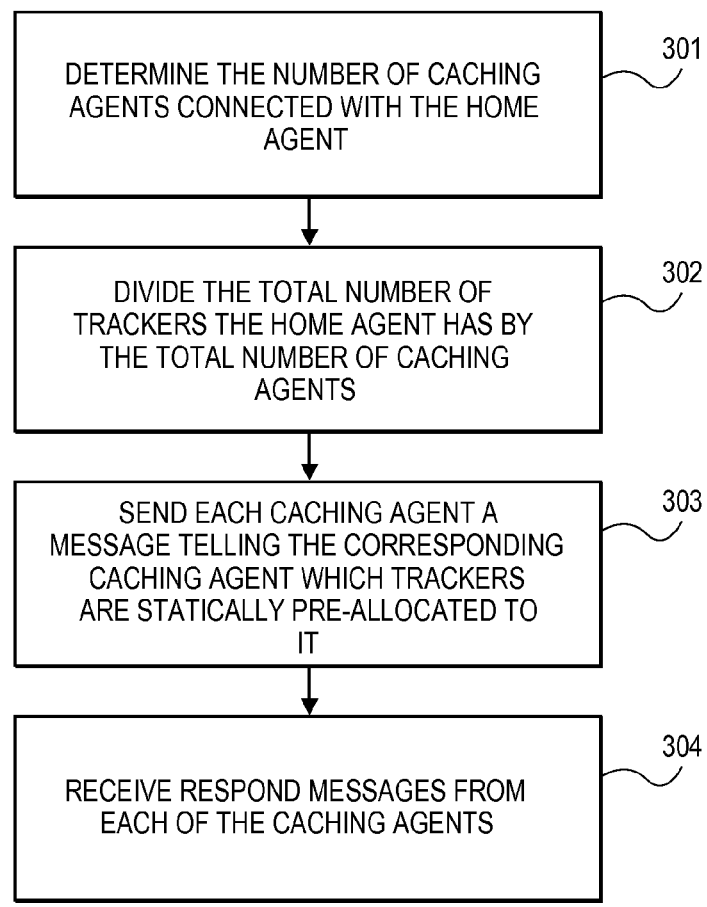
FIG. 3 is a flow diagram illustrating an initial tracker allocation process according to an embodiment of the present invention.

FIG. 3 is a flow diagram illustrating an initial tracker allocation process according to an embodiment of the present invention. At block 301, the home agent 3 determines how many caching agents are connected to it. The home agent 3 may find out this number by broadcasting a message requesting each caching agent receiving this message to send a response. Alternatively, the home agent 3 is told the number of caching agents connected with it during configuration process. At block 302, the home agent 3 divides the total number of trackers it has by the number of caching agents. For example, if the total number of trackers the home agent 3 has is 64 and the total number of caching agents is 8, then each caching agent gets 8 trackers during initialization by static pre-allocation. At block 303, the home agent sends each caching agent a message telling the corresponding caching agent which trackers are statically pre-allocated to it. For example, for simplicity of the implementation, the home agent 3 may statically pre-allocate trackers 1-8 to caching agent 11, trackers 9-16 to caching agent 12, trackers 17-24 to caching agent 13, . . . , and trackers 57-64 to caching agent 18. Upon receiving the message by each caching agent, the corresponding caching agent set the corresponding entries of the tracker allocation vector as "1". For example, upon receiving the message from the home agent 3, caching agent 11 sets the entries 1-8 of the tracker allocation vector 201 as "1" and other entries as "0". After each caching agent finishes setting its corresponding tracker allocation vector, it sends a message back to the home agent 3 to tell the home agent that it has finished the initialization. When the home agent 3 receives the response message from all caching agents, the static pre-allocation initialization finishes.

Figure 4:
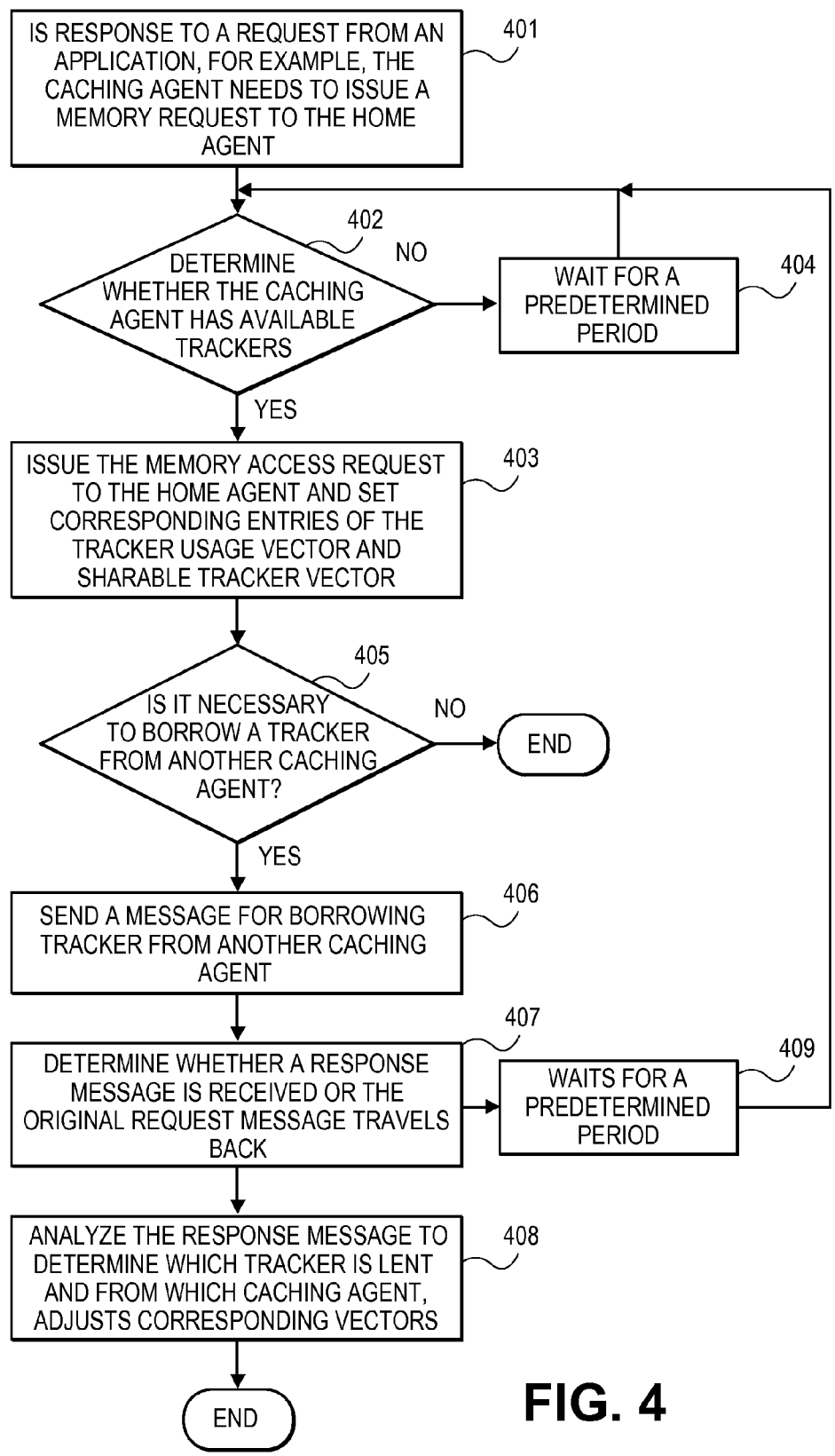
FIG. 4 is a flow diagram illustrating an exemplary process of one caching agent sending a message for borrowing a tracker from another caching agent.

FIG. 4 is a flow diagram illustrating an exemplary process of one caching agent sending a message for borrowing a tracker from another caching agent. FIG. 4 is illustrated together with FIG. 2. At block 401, caching agent 11 needs to issue a request to access the memory 4, in response to a request from an application running on the caching agent, for example. At block 402, caching agent 11 determines whether it has tracker(s) available for issuing a request to home agent 3. A tracker is available for a caching agent if the tracker is allocated to the caching agent or borrowed from another caching agent, and the tracker is not being used in an outstanding request from the caching agent to the home agent. An outstanding request is a request that has already been issued, but has not been served yet. To determine whether the caching agent has tracker(s) available, the tracker control logic 211 of the caching agent 11 may check the corresponding entries of the tracker allocation vector 201, the borrowed tracker vector 202 and the tracker usage vector 203.

If caching agent 11 has tracker(s) available, then at block 403, caching agent 11 issues the request to the home agent 3. At the same time, the tracker control logic 211 of caching agent 11 sets the corresponding entry of the tracker usage vector 203 to indicate that the tracker is being used for the newly issued outstanding request. Further, the tracker control logic 211 sets the corresponding entry of the sharable tracker vector 204 to indicate that the tracker being used for the newly issued outstanding request is not available for sharing. If, however, caching agent 11 does not have tracker available, then at block 404, caching agent 11 waits for a predetermined period of time and the control flow goes back to block 402.

At block 405, caching agent 11 determines whether it is necessary to borrow a tracker from another caching agent. In an embodiment, the caching agent determines whether the number of outstanding requests to the home agent 3 is greater than or equal to a threshold. In one embodiment, the threshold is a number smaller than the number of trackers statically pre-allocated to the caching agent. For example, the threshold may be 7, if the number of trackers statically pre-allocated to the caching agent is 8. If the number of outstanding requests to home agent 3 is greater than or equal to the threshold, at block 406, caching agent 11 sends a message to the tracker request link (or virtual link) of ring 5 and waits for a response. If the number of outstanding requests to home agent 3 is less than the threshold, the flow ends.

The message is first transmitted via the tracker request link (or virtual link) of ring 5 to caching agent 12. If caching agent 12 has available trackers for share, then caching agent 12 sends a message in response to the message received from caching agent 11. The response is sent via the other link (or virtual link) of ring 5, the response link. In an embodiment, the tracker request link (or virtual link) and the response link (or virtual link) transmit messages in reverse direction. If, however, caching agent 12 does not have available trackers for share, caching agent 12 forwards the message received from caching agent 11 to the next caching agent, caching agent 13, via the tracker request link (or virtual link). By the same token, caching agent 13 does the same thing as caching agent 12 in processing the message originated from caching agent 11. If no caching agent has tracker available for share, then the message from caching agent 11 will eventually be transmitted back to caching agent 11 via the tracker request link. Otherwise, a response message will be received by caching agent 11 via the response link (or virtual link).

Back to the discussion of FIG. 4, at block 407, caching agent 11 determines whether a response message is received or the original request message travels back. If a response message is received from one of the other caching agents, then, at block 408, the tracker control logic 211 of caching agent 11 analyzes the response message to determine which tracker is lent to caching agent 11 and from which caching agent. At the same time, the tracker control logic 211 sets the corresponding entry of the borrowed tracker vector 202 to "1", indicating the corresponding tracker is borrowed from another caching agent, and is available for caching agent 11. If, however, caching agent 11 determines, at block 407, that the original request message is transmitted back, then, in an embodiment, at block 409, caching agent 11 waits for a predetermined period of time and the control flow goes back to 402. Alternatively, at block 409, after caching agent 11 waits for a predetermined period of time, the control flow may goes to 406 to resend the message to borrow a tracker from another caching agent.

Figure 5:
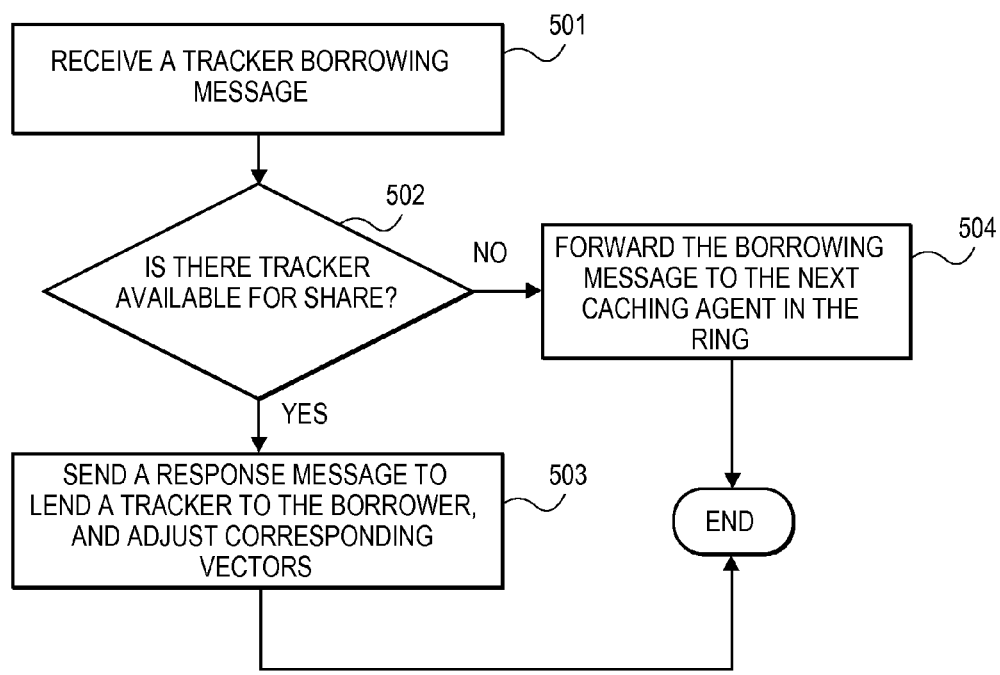
FIG. 5 is a flow diagram illustrating an exemplary process of processing a tracker borrowing message by a caching agent that receives the message

FIG. 5 is a flow diagram illustrating an exemplary process of processing a tracker borrowing message by a caching agent that receives the message. FIG. 5 is illustrated in view of FIGS. 2 and 4. Further, it is assumed that the tracker borrowing message is originated from caching agent 11, caching agent 12 forwarded the message to caching agent 13 because caching agent 12 has no available tracker for share, and caching agent 13 receives the message. At block 501, caching agent 13 receives a tracker borrowing message originated from caching agent 11. At block 502, the tracker control logic of caching agent 13 determines whether it has tracker available for share. The tracker control logic 213 may check the sharable tracker vector of caching agent 13 to determine whether there is sharable tracker(s) available to be lent to the borrower. In an embodiment, caching agent 13 may reserve a predetermined number of trackers exclusively for use by itself only. In other words, the tracker control logic 213 may determine whether the number of tracker allocated to caching agent 13 but not being used by any caching agents (including caching agent 13) exceeds a threshold (the predetermined number). If caching agent 13 has a tracker available for share, then, at block 503, caching agent 13 sends a response message to caching agent 11, the borrower, via the response link (or virtual link) of ring 5. At the same time, the tracker control logic of caching agent 13 sets the corresponding entry of the tracker usage vector of caching agent 13 to "1", indicating the corresponding tracker is being used. Further, the tracker control logic sets the corresponding entry of the sharable tracker vector to "0", indicating the corresponding tracker is not available for share. Later, caching agent 13 may send a message to caching agent 11 to reclaim the tracker back if necessary. On the other hand, if caching agent 13 does not have tracker(s) available for share, then, at block 504, caching agent 13 forwards the borrower's request to the next caching agent, caching agent 14.

Figure 6:
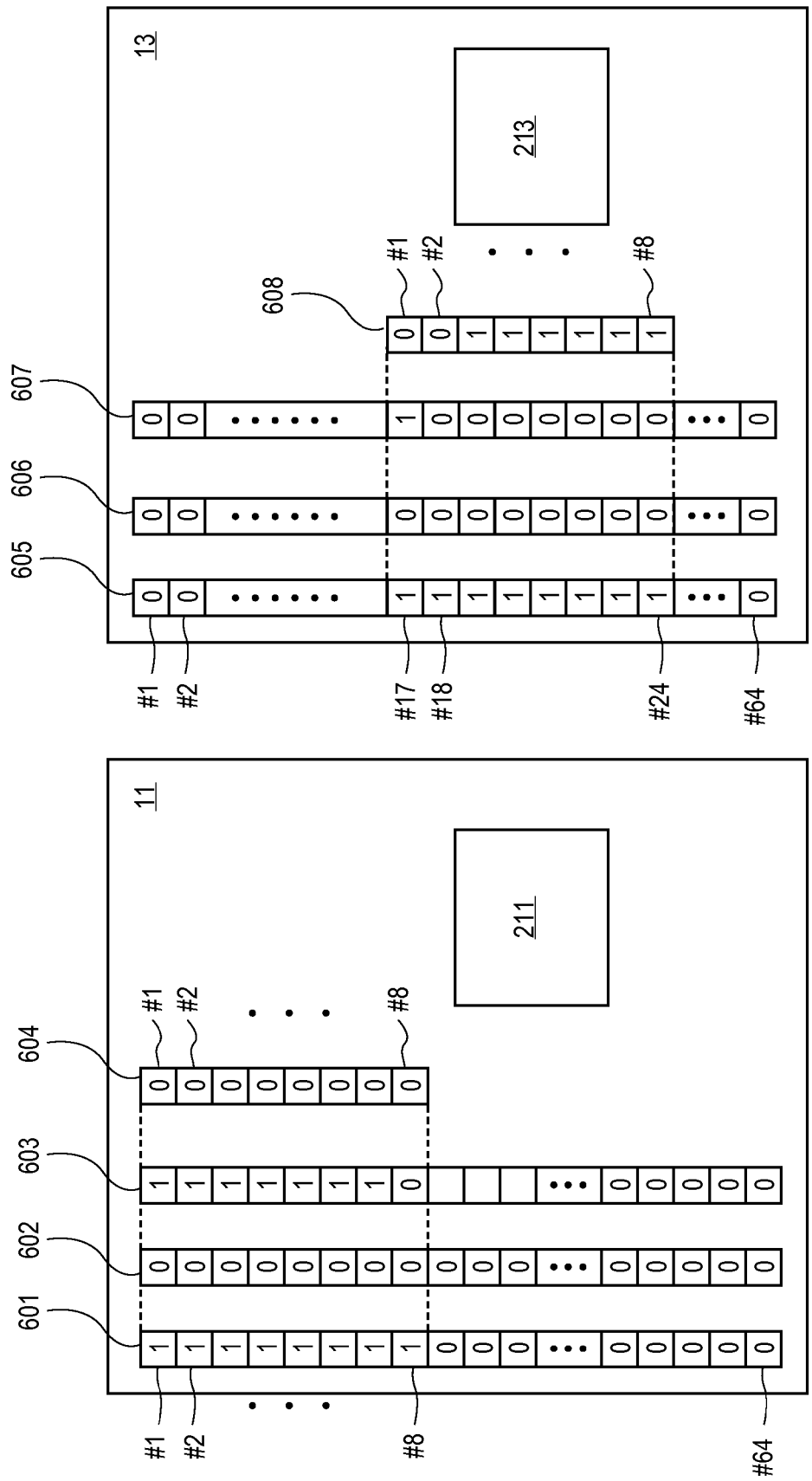
FIG. 6 is a block diagram illustrating exemplary tracker usages in two caching agents before one of the caching agents borrows a tracker from the other caching agent.

FIG. 6 is a block diagram illustrating exemplary tracker usages in two caching agents. As shown in FIG. 6, tracker allocation vector 601 of caching agent 11 records the trackers that have been statically pre-allocated to caching agent 11. As shown, entries #1-#8 of tracker allocation vector 601 are set to "1", meaning trackers #1 to #8 are pre-allocated to caching agent 11. All entries of borrowed tracker vector 602 are set to "0", meaning caching agent 11 has not borrowed tracker(s) from other caching agents. Also as shown, entries #1-#7 of the tracker usage vector 603 are set to "1", meaning trackers #1 -#7 are being used by the caching agent 11. Since all entries of the sharable tracker vector 604 are set to "0", caching agent 11 does not have sharable trackers to lend to other caching agents for now. Also as shown, entries #17-#24 of the tracker allocation vector 605 of caching agent 13 are set to "1", meaning trackers #17-#24 are statically pre-allocated to caching agent 13. All entries of the borrowed tracker vector 606 of caching agent 13 are set to "0". Only entry #17 of the tracker usage vector 607 of caching agent 13 is set to "1", meaning caching agent 13 is only using tracker #17 currently. Entries #1 and #2 of the sharable tracker vector 608 are set to "0" meaning that trackers #17 and #18 are not available for lending to other caching agents.

Figure 7:
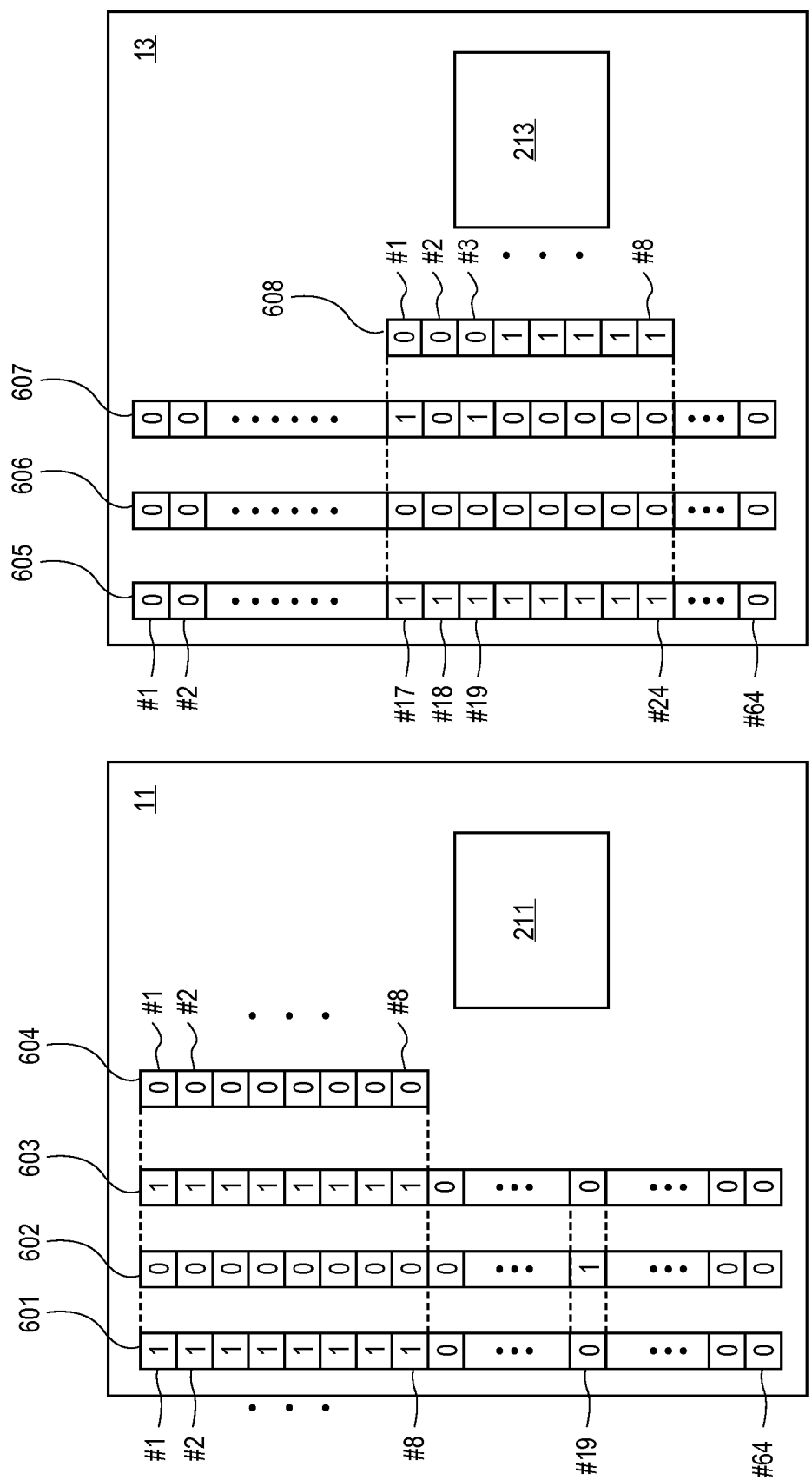
FIG. 7 is a block diagram illustrating exemplary tracker usages in the two caching agents shown in FIG. 4 after one of the caching agents borrows a tracker from the other caching agent.

FIG. 7 is a block diagram illustrating exemplary tracker usages in the two caching agents shown in FIG. 6 after one of the caching agents borrows a tracker from the other caching agent. As shown in FIG. 5, caching agent 11 borrowed tracker #19 from caching agent 13. Accordingly, entry #19 of borrowed tracker vector 602 of caching agent 11 is set to "1", meaning tracker #19 is currently being borrowed by caching agent 11. At the same time, caching agent 13 sets entry #3 of sharable tracker vector 608 (which is corresponding to tracker #19) to "0", meaning tracker #19 is not currently available for sharing for other caching agents (since it is being used by caching agent 11 now). In addition, caching agent 13 sets entry #19 of tracker usage vector 607 to "1", indicating the corresponding tracker is being shared by another caching agent.

Note that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behavioral level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; etc.

"Logic", as is used herein, may include, for example, software, hardware and/or combinations of hardware and software.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   receiving, at a first node, a first message originated from a second node for borrowing a tracker from another node so that the second node is able to issue a request to a home node for accessing a memory controlled by the home node, wherein a tracker represents a state of a transaction;
   if the first node has a available tracker, sending a second message in response to the first message to lend the available tracker to the second node, wherein a tracker is available when the tracker is allocated to the first node or borrowed from another node, and is not being used in any outstanding request from the first node to the home node; and
   if the first node does not have a available tracker, forwarding the first message to a third node.

2. The method of claim 1, wherein the first node, the second node and the third node reside in a ring.

3. The method of claim 2, wherein the ring comprises a plurality of nodes, including the first node, second node and third node.

4. The method of claim 3, wherein the ring further comprises a first ring link and a second ring link, the first ring link to transmit tracker request messages and the second ring link to transmit messages in response to the tracker request messages.

5. The method of claim 4, wherein each of the first and second ring links comprises a virtual link.

6. The method of claim 5, wherein each of the nodes is pre-allocated a predetermined number of trackers from a plurality of trackers, each of the plurality of trackers allowing one of the plurality of nodes to issue a request to the home node for accessing the memory.

7. The method of claim 6, wherein the first message is received at the first node via the first ring link.

8. The method of claim 7, wherein sending the second message in response to the first message to lend the available tracker to the second node comprises sending the second message via the second ring link in response to the first message to lend the available tracker to the second node.

9. The method of claim 1 further comprising:
   if the first message returns to the second node, the second node resends the first message after a predetermined period of time.

10. The method of claim 1 further comprising:
    after sending the second message in response to the first message to lend the available tracker to the second node, sending a third message to the second node to reclaim the available tracker if the first node needs the available tracker.

11. The method of claim 3, wherein each of the plurality of nodes comprises a caching agent.

12. The method of claim 11, wherein the home node comprises a home agent.

13. An apparatus comprising:
    a memory;
    a first node controlling the memory, wherein the first node maintains a plurality of trackers, wherein a tracker allows a node to issue a request to a home node for accessing a memory controlled by the home node;
    a plurality of second nodes in a ring, each of the plurality of second nodes comprising
       a port to link to the first node,
       a vector to record one or more trackers allocated to the corresponding second node from the plurality of trackers,
       a first logic to determine whether it is necessary to borrow a tracker from another second node, and
       a second logic to determine whether the corresponding second node is able to lend a tracker to another second node in response to a tracker borrowing message originated from said another second node.

14. The apparatus of claim 13, wherein the ring comprises a first ring link and a second ring link, the first ring link to transmit tracker request messages and the second ring link to transmit messages in response to the tracker request messages.

15. The apparatus of claim 14, wherein each of the first and second ring links comprises a virtual link.

16. The apparatus of claim 13, wherein each of the second nodes comprises a caching agent, and the first node comprises a home agent.

17. The apparatus of claim 16, wherein each of the plurality of trackers allows a caching agent to issue a request to the home agent for accessing the memory.

18. The apparatus of claim 17, wherein to determine whether it is necessary to borrow a tracker from another second node comprises to determine whether the number of outstanding requests issued by the corresponding second node to the first node exceeds a threshold.

19. The apparatus of claim 17, wherein to determine whether the corresponding second node is able to lend a tracker to another second node in response to a tracker borrowing message originated from said another second node comprises to determine whether the number of trackers allocated to the corresponding second node but not being used by any second node exceeds a threshold.

20. The apparatus of claim 13, wherein each tracker entry in the vector includes a 1-bit flag to indicate if the tracker was pre-allocated.

21. A caching agent comprising:
    means for recording one or more trackers allocated to the caching agent from a plurality of trackers maintained by a home agent, each of the plurality of trackers to allow a request to be sent to the home agent for accessing a memory controlled by the home agent;
    means for determining whether it is necessary to borrow one of the plurality of trackers that has been allocated to a second caching agent, and means for determining whether the caching agent is able to lend one of the one or more trackers to a third caching agent in response to a first message originated from the third caching agent.

22. The caching agent of claim 21 further comprising means for connecting to the second caching agent and the third caching agent and means for connecting to the home agent.

23. The caching agent of claim 22, wherein said determining whether it is necessary to borrow one of the plurality of trackers that has been allocated to a second caching agent comprises determining whether the number of outstanding requests issued by the caching agent to access the memory exceeds a threshold.

24. The caching agent of claim 23, wherein said determining whether the caching agent is able to lend one of the one or more trackers to a third caching agent in response to a first message originated from the third caching agent comprises determining whether the number of trackers allocated to the caching agent but not being used by any caching agent exceeds a threshold.

* * * * *